United States Patent [11] 3,617,125

[72] Inventors Mark D. Sobottke; Clifford W. Kruer, both of Dayton, Ohio
[21] Appl. No. 818,997
[22] Filed Apr. 24, 1969
[45] Patented Nov. 2, 1971
[73] Assignee The National Cash Register Company Dayton, Ohio

[54] AUTOMATIC GENERATION OF MICROSCOPIC PATTERNS IN MULTIPLICITY AT FINAL SIZE
8 Claims, 11 Drawing Figs.

[52] U.S. Cl. 355/46, 95/4.5, 355/53, 355/72
[51] Int. Cl. G03b 27/44
[50] Field of Search 355/40, 43, 46, 53, 72; 95/4.5

[56] References Cited
UNITED STATES PATENTS

| | | | |
|---|---|---|---|
| 2,515,862 | 7/1950 | Carlton et al. | 355/40 |
| 3,495,512 | 2/1970 | Vaughan | 355/53 X |
| 3,498,711 | 3/1970 | Ables et al. | 355/53 |

*Primary Examiner*—Samuel S. Matthews
*Assistant Examiner*—Richard A. Wintercorn
*Attorneys*—Louis A. Kline, Albert L. Sessler, Jr. and Elmer Wargo

ABSTRACT: An apparatus for automatically generating geometric patterns (like microcircuit photomasks) in multiplicity at final size. The apparatus includes an indexing table for supporting photosensitive media and for indexing the media along coordinate directions at right angles to each other. The apparatus also includes an optical imaging system for directing a shaped pattern image onto said media. The imaging system includes an aperture plate for shaping the image; a multiple lens unit for producing a plurality of images corresponding to said pattern image on said media; and a collimator lens positioned between the aperture plate and the multiple-lens unit. The pattern image is simultaneously repeated on the media with a high degree of accuracy. A numerical controller, which is tape fed, is used to control the operation of the apparatus.

PATENTED NOV 2 1971 3,617,125

SHEET 1 OF 8

INVENTORS
MARK D. SOBOTTKE &
CLIFFORD W. KRUER
BY
THEIR ATTORNEYS

INVENTORS
MARK D. SOBOTTKE &
CLIFFORD W. KRUER
BY [signatures]
THEIR ATTORNEYS

INVENTORS
MARK D. SOBOTTKE &
CLIFFORD W. KRUER

BY Louis A. Klein
Albert L. Jeffs
Elmer Wargo
THEIR ATTORNEYS

INVENTORS
MARK D. SOBOTTKE &
CLIFFORD W. KRUER

BY Louis A. Kline
Albert L. Jeffers
Elmer S. Vargo
THEIR ATTORNEYS

INVENTORS
MARK D. SOBOTTKE &
CLIFFORD W. KRUER
BY
THEIR ATTORNEYS

INVENTORS
MARK D. SOBOTTKE &
CLIFFORD W. KRUER
BY Louis A. Kline
Albert L. Jeffers
Elmer Vargo
THEIR ATTORNEYS

INVENTORS
MARK D. SOBOTTKE &
CLIFFORD W. KRUER
BY
THEIR ATTORNEYS

INVENTORS
MARK D. SOBOTTKE &
CLIFFORD W. KRUER
BY
THEIR ATTORNEYS

AUTOMATIC GENERATION OF MICROSCOPIC PATTERNS IN MULTIPLICITY AT FINAL SIZE

BACKGROUND OF THE INVENTION

This invention relates to an apparatus for automatically generating geometric patterns, like microcircuit photomasks, in multiplicity and in final size.

One of the major problems encountered in manufacturing integrated circuits occurs in the making of photomasks used in etching and diffusing circuit wafers. Very often, six or more masks are needed to make a single circuit, making it difficult to achieve precise registration and high resolution across an entire wafer.

One of the conventional methods of producing a photomask is to make the mask pattern in a greatly enlarged size and then reduce it optically to the desired size by a series of successive reductions with conventional camera techniques. This method is expensive, time consuming, and not wholly satisfactory, due to the resolution of the mask being generally less than desirable at the fringes of the mask when the pattern is large.

Another conventional method of producing a photomask is to utilize a sharply defined pencil of light which is brought to focus on the surface of a photosensitive plate which is positioned on an *x-y* coordinate positioning device. By controlling the movement of the positioning device and by controlling the pencil of light with a shutter mechanism, a geometric pattern can be generated on the photosensitive device. Unless the movement of the positioning device is very accurately controlled, there is generally poor alignment or registration between different photomasks produced on the device when a microcircuit is being produced.

Some of the prior art apparatuses for controlling the indexing of the positioning device used in the above method include laser-operated positioners and positioners which operate on interferometer principles. These apparatuses are generally complex and expensive, and require special controlled environments in which to operate.

In contrast with the above, applicants' apparatus is economical to manufacture and produces high-quality microcircuit masks at final size and in the desired number of multiples for direct use on microcircuit wafers. The quality of the masks produced on the apparatus of this invention satisfies the most stringent requirements of modern integrated circuitry. The apparatus also eliminates "step and repeat" errors between different members of a photomask set by eliminating the "step and repeat" operation itself; this is accomplished by generating a multiplicity of micropatterns in parallel by a multiple image lens assembly having lenses of fixed centers. Because of system repeatability inherent in the design of the apparatus, one photomask of a set of photomasks may be corrected or altered without making an entirely new set. The photomask corrections and variations are effected by making changes in control tapes associated with a controller which controls the generation of the geometric patterns instead of making changes on art work, which must be reduced in successive stages. With the apparatus of this invention, a high degree of registration is obtained in a set of photomasks through a high degree of repeatability of coordinate positions. For example, even though one area of a photomask produced by applicants' apparatus may be slightly off registration, when considered from an absolute accuracy standpoint, all the photomasks of a set of photomasks to be made would be subjected to the same slight misregistration, and, consequently, when the set of photomasks is assembled, the resulting set would have a high degree of registration. Applicants' apparatus does not need to be operated in a critically controlled environment, and eliminates the need for and the storage of geometrical art work.

SUMMARY OF THE INVENTION

This invention relates to an apparatus for automatically generating a basic pattern at a final size, which pattern is duplicated by a multiple lens unit on a microcircuit element (like a photomask). The apparatus includes an indexing table, means adapted to be moved along *x* and *y* coordinate directions at right angles to each other, and means for supporting a photosensitive medium on the table means. An optical imaging system is used to project light in a single pattern image which is duplicated many times on the medium. The imaging system includes an aperture means for shaping the light into said pattern image and a multiple-lens unit having a plurality of individual lenses located therein. A collimator lens means is positioned along the optical patch of the imaging system between the aperture means and the multiple-lens unit, so as to direct said single pattern image through each of said individual lenses along a path which is substantially coincident with the optical axis of each of the individual lenses, resulting in an accurate duplication of the pattern image on the medium. Control means which is tape fed is used to control the operation of the apparatus.

DESCRIPTION OF THE PREFERRED EMBODIMENT

The apparatus of this invention, hereinafter called a microscriber, can best be explained in general with reference to FIG. 1. The microscriber, designated generally as 20, is shown only schematically along with the control means for controlling the operation thereof.

Figure 1:
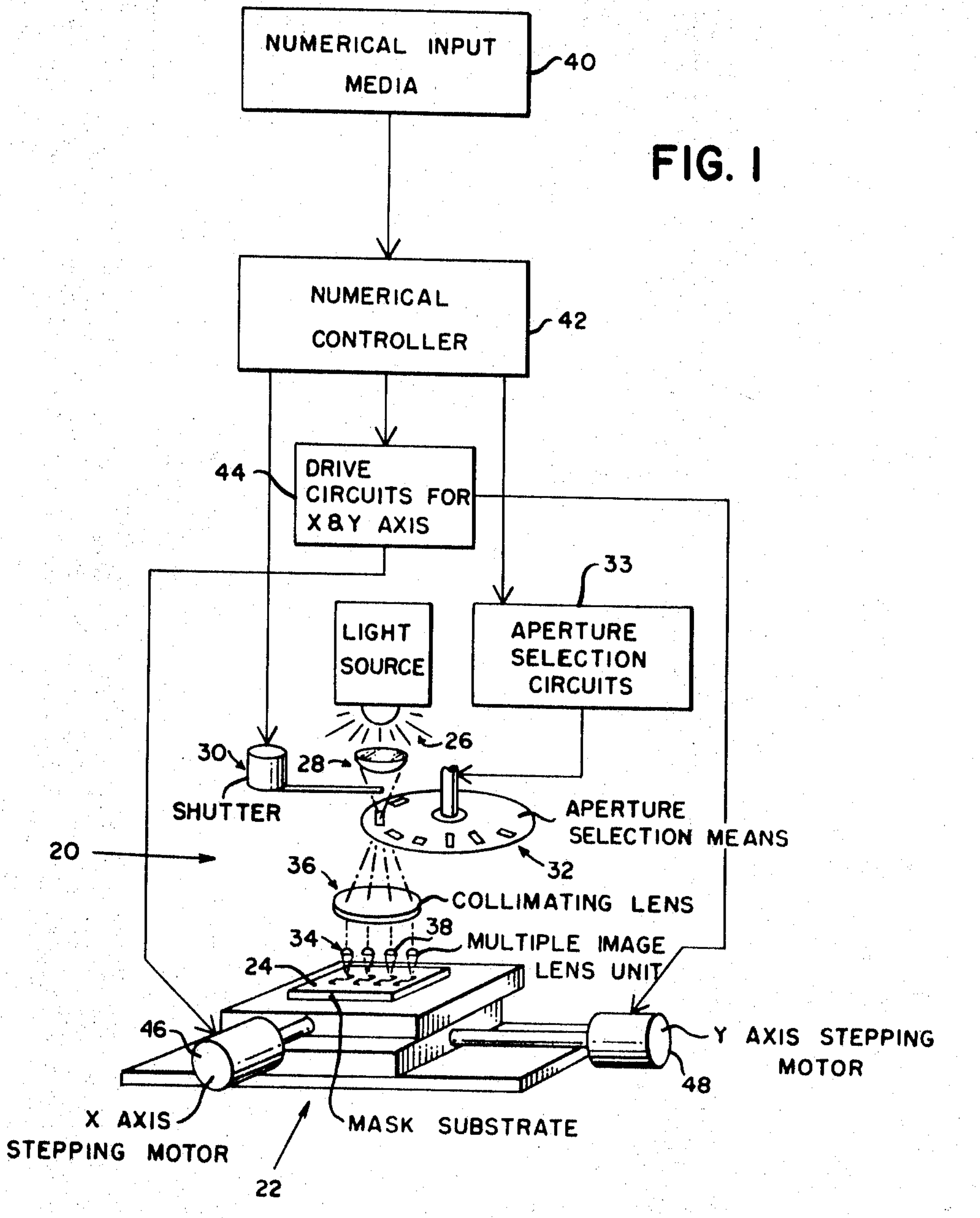
FIG. 1 is a schematic diagram, partially in perspective used to generally describe the operation of the invention.

The various general elements constituting the microscriber 20 are shown in FIG. 1 and include an indexing table means 22, to which a photosensitive medium 24 is secured. The table means 22 is adaptable to move the medium 24 along *x* and *y* coordinate directions at right angles to each other. An optical imaging system is used to project a single pattern image, which is simultaneously repeated many times on the medium 24, which is moved by the table means 22.

The optical imaging system of the microscriber 20, shown only schematically in FIG. 1, includes a slight source means 26, collimating lens means 28, and a shutter means 30. The system also includes an aperture selection means 32, which is used to control the shape of the pattern image projected on the photosensitive medium 24. A multiple image lens unit 34 is positioned above the medium 24, and a collimating lens means 36 is positioned between the aperture selection means 32 and the multiple image lens unit 34. The collimator lens means 36 directs the single pattern image formed by the aperture selection means 32 through each of the individual lenses 38 of the multiple image lens unit 34 along a path which is substantially coincident with the optical axis of each of said individual lenses, so as to simultaneously repeat the pattern image on the medium 24.

The general operation of the microscriber 20 will now be described in relation to the control means, shown only schematically in FIG. 1. Because the control means as such do not form a part of this invention, any conventional control means may be used. The control means may be of the type disclosed in pages 66 to 80 of a Technical Report AFAL-TR-68-237 entitled "High Resolution Rapidly Programmable Masking for Functional Electronic Blocks," published in Oct. 1968 by the Air Force Avionics Laboratory, Wright-Patterson Air Force Base, Ohio, 45433, U.S.A.

The control means shown in FIG. 1 may be a numerical control means in which the commands for a machine motion are expressed as numbers in a universal machine language. The machine language is stored on numerical input media 40, like punched paper tape, which is read into a numerical controller 42. One output from the controller 42 is used to control the shutter means 30, and another output therefrom is fed to an aperture selection circuit 33, which controls the aperture selection means 32. A third output from the numerical controller 42 is used to control drive circuits 44, which control the movement of the indexing table means 22. One output from the drive circuits 44 is used to control a conventional bidirectional stepping motor 46, which moves the indexing table means 22 in an $x$ direction, and another output from the drive circuits 44 is used to control a conventional stepping motor 48, which moves the table means 22 in a $y$ direction, the movements in the $x$ and $y$ directions being at right angles to each other.

Assuming that the indexing table means 22 of FIG. 1 is in a home or reference position, and a "writing" operation is to be effected by the microscriber 20, the following general operation would follow. With the light source means 26 turned on, the numerical input medium 40 is fed into the numerical controller 42. Based upon the instructions contained in the medium 40, the particular aperture in the aperture selection means 32 to be used for writing a particular line width would be selected by the aperture selection circuit 33 and positioned in the optical path of the microscriber 20. At the appropriate time, the shutter means 30 would be actuated by the numerical controller 42 to permit light from the source means 26 to be shaped by the aperture selection means 32, and the pattern image passing therethrough would be collimated by the collimating lens means 36 and directed to each one of the individual lenses 38 of the multiple image lens unit 34. The pattern image is duplicated by each one of the lenses 38, so as to produce a multiplicity of the pattern image on the photosensitive medium 24. The indexing table means 22 is then indexed an appropriate incremental amount in either the $x$ or the $y$ direction, and the "writing" operation just described is then repeated to "write" additional segments of the pattern image on the medium 24. The segments so written overlap slightly to produce continuity in the image patterns on the medium 24. The images may be produced on conventional materials for producing masks, or the images may be produced directly on silicon photoresist to completely eliminate the use of masks in the fabrication of microcircuits.

The general operation of the microscriber 20 having been described, the individual components thereof will now be described in more detail.

Figure 3:
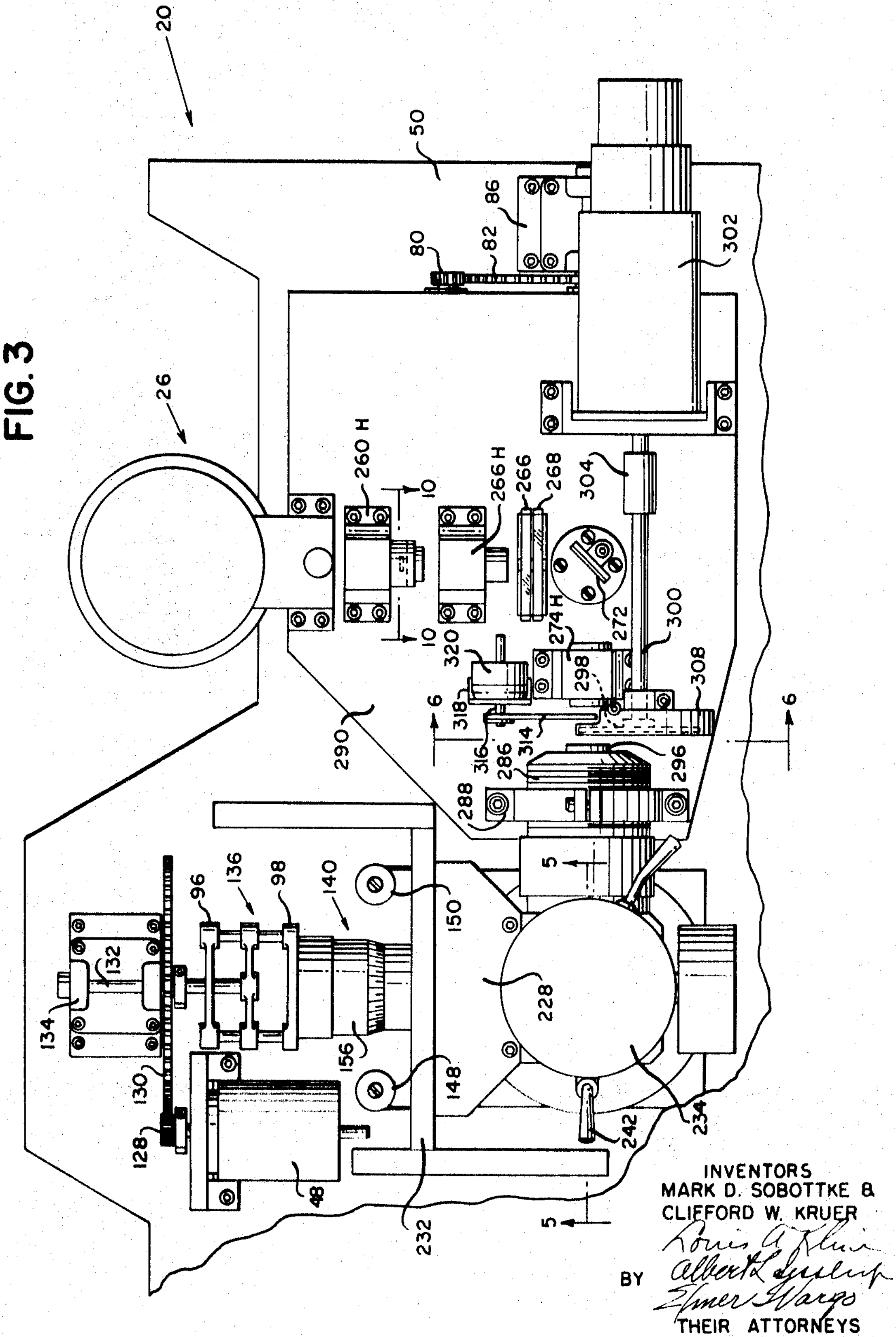
FIG. 3 is a top view of the invention shown in FIG. 2, showing more details thereof.
Figure 4:
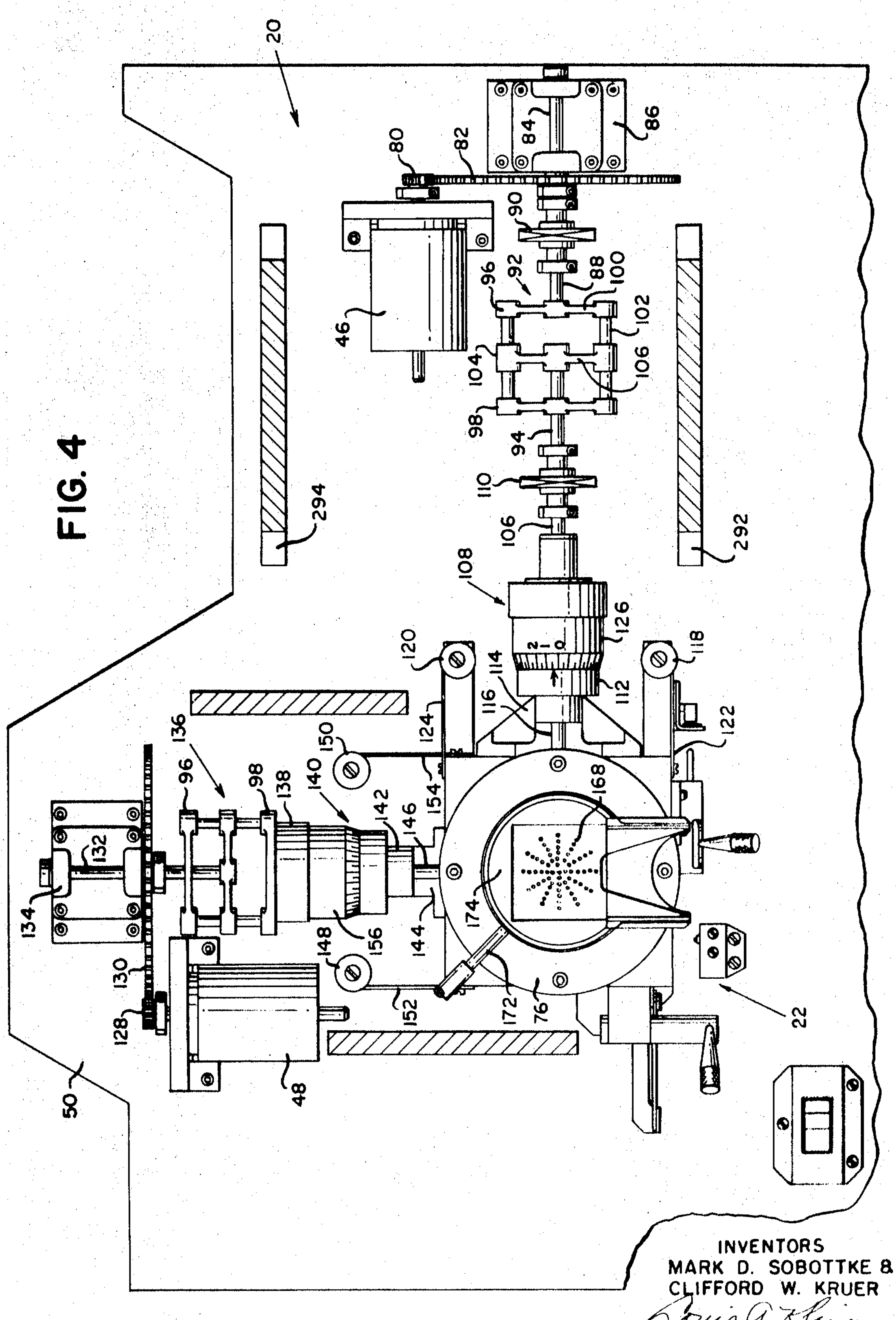
FIG. 4 is a view, partly in cross section, taken along the line 4—4 of FIG. 2, showing more details of the indexing table and a mounting plate for receiving a photosensitive medium.
Figure 5:
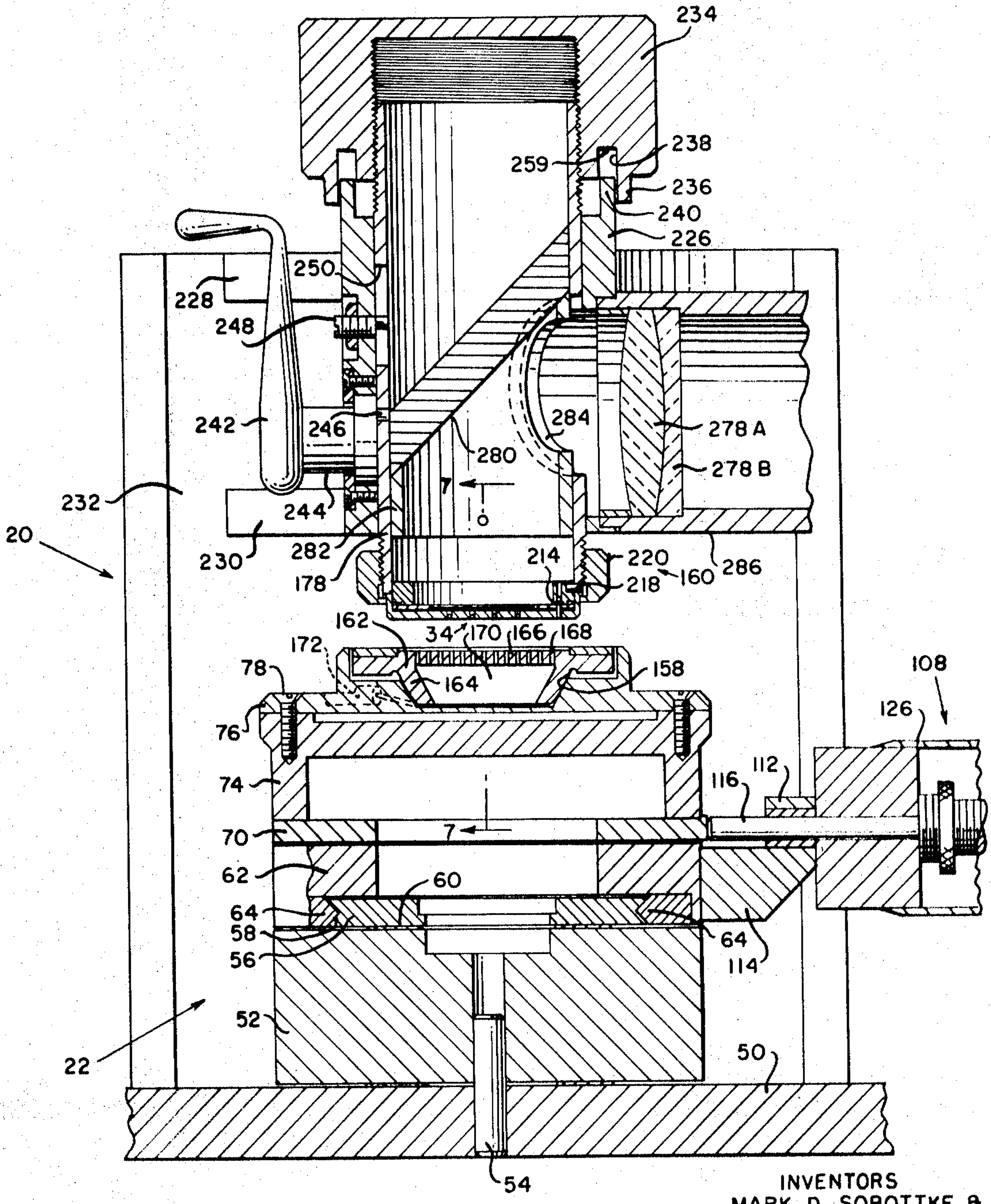
FIG. 5 is an enlarged, elevational view, partly in cross section, and is taken along the line 5—5 of FIG. 3 to show additional details of the mounting plate on the indexing table and the lens system used with the invention.

The indexing table means 22 of the microscriber 20, described only generally in relation to FIG. 1, is shown in more detail in FIGS. 2, 3, 4, 5, and 7. The indexing table means 22 may be of the type commercially used in the staging of a toolmaker's microscope or of the type used on optical comparators; therefore, the description which follows will be only general. The microscriber 20 includes a base plate 50, on which the table means 22 is mounted. The table means includes a stationary base 52, which is pinned to the baseplate 50 by pins, like the pin 54 (FIG. 5). The base 52 has a plate 56 (with V-shaped grooves 58 in the opposed sides thereof) secured thereto, as shown in FIG. 5. The plate 56 is spaced from the base 52 by a thin spacer 60. A complementary plate 62 has opposing V-shaped projections 64, which slidingly fit into the grooves 58 of the plate 56, permitting the plate 62 to slide along a direction which is perpendicular to the plane of the sheet of FIG. 5 and which direction is considered the $y$ direction of the $x$ and $y$ coordinate axes mentioned previously.

Figure 7:
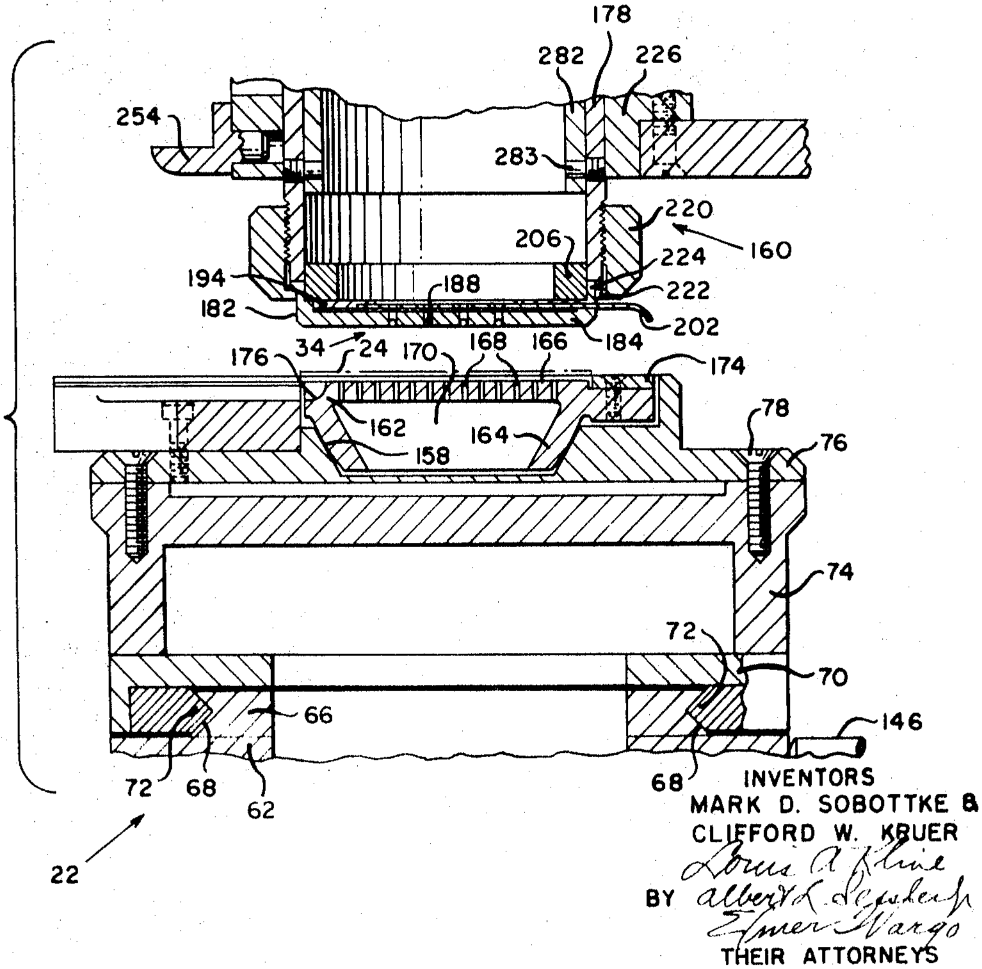
FIG. 7 is an enlarged, elevational view, taken along the line 7—7 of FIG. 5 to show additional details of the mounting plate and lens system.

The structure for enabling the indexing table means 22 to be moved in an $x$ direction (which is perpendicular to the $y$ coordinate axis) is shown principally in FIG. 7. The structure includes a plate 66, which is secured to the plate 62 and which plate 66 has V-shaped grooves 68 in opposed sides thereof. A complementary plate 70 has opposing V-shaped projections 72, which slidingly fit into the grooves 68, as shown. A capping plate 74 is secured to the plate 70, and a mounting plate 76 is secured to the plate 74 by fasteners 78. The plate 70, which slides in the grooves 68, and the plates 74 and 76, which are secured to the plate 70, move in a direction which is perpendicular to the sheet of FIG. 7, and which direction is considered the $x$ direction.

The means for moving the indexing table means 22 along the $x$ and $y$ coordinate directions is shown principally in FIG. 4. As stated in the general summary, the drive circuits 44 (FIG. 1) control the operation of the stepping motor 46 to move the indexing table means 22 in an $x$ direction. The stepping motor 46 is conventional and is secured to the base 50 (FIG. 4). The output shaft of the motor 46 rotates an output gear 80 fixed thereto, and the gear 80 is in mesh with a larger gear 82, which is fixed to a shaft 84. The shaft 84 is rotatably mounted in a support block 86, which is secured to the base 50, and the shaft 84 is restrained against axial movement in the block 86. One end of the shaft 84 is fixed to one end of a shaft 88 (by a coupling member 90). The shaft 88 is part of a low-angular-backlash telescoping coupling member 92, which transmits the rotary motion of the shaft 84 to a second shaft 94 of the coupling member 92. The coupling member 92 is composed of spider members 96 and 98, with the spider member 96 being fixed to rotate with the shaft 88. The members 96 and 98 each have two arms, spaced 180° apart, and these arms, like the arm 100, have a shaft 102 connecting aligned arms of the members 96 and 98, so as to maintain the spider members 96 and 98 in axial alignment and in fixed, spaced parallel relationship, as shown. Another spider member 104 has two arms, like the arm 107, which are aligned with the arms 100 and are apertured at their outer ends to slidingly receive the shafts 102. The spider member 104 has a central hub, which is fixed to one end of the shaft 94 to rotate therewith, and the member 104 is mounted between the spider members 96 and 98, permitting the shaft 94 to move in an axial direction while being rotated in either direction by the shaft 84. The shafts 94, 88, and 84 are axially aligned with one another, and the shaft 94 is rotatably mounted in the central hub of the spider member 98. The remaining end of the shaft 94 is connected to a shaft 106 of a conventional micrometer lead screw member 108 by a coupling member 110. The lead screw member 108 has one end 112 fixed to an extension plate 114, which is secured to the plate 62 (FIG. 5). As the motor 46 steps (FIG. 4) in either direction, it will rotate the shaft 106 of the lead screw member 108 accordingly, and advance or withdraw a shaft 116 associated with the lead screw member 108. The shaft 116 is kept in abutting relationship with the plate 70 (FIG. 5) by two constant-tension spring members 118 and 120 (FIG. 4). The extensible ends 122 and 124 of these spring members are secured to opposed sides of the plate 70 to make the plate follow the movement of the shaft 116 when it is withdrawn into the lead screw member 118. The lead screw member 108 has a calibrated barrel 126 to permit direct reading of the location of the indexing table means 22 in an $x$ direction.

The means for moving the indexing table means in a *y* direction is also principally shown in FIG. 4. As stated in the general summary, the drive circuits 44 (FIG. 1) control the operation of the stepping motor 48 to move the indexing table means 22 in a *y* direction. The stepping motor 48 is operatively connected to the indexing table means 22 by a construction similar to that already described in relation to the motor 46. This construction includes gears 128 and 130, the gear 130 being fixed to rotate with a shaft 132. The shaft 132 is rotatably mounted in a support block 134 and is fixed against axial movement therein. The shaft 132 is part of a coupling member 136, which is similar to the coupling member 92, already described, except that the shaft 132 is fixed against axial movement, and the spider members 96 and 98 of the coupling member 136 an move axially together while transmitting rotary motion from the motor 48, which is a conventional bidirectional stepping motor. The spider member 98 if fixed to the input member 138 of a conventional lead screw member 140 to rotate it. The lead screw member 140 has one end 142 fixed to a support member 144, which is secured to the base 52, and the lead screw member 140 has a shaft 146 abutting against the plate 62 (FIG. 7), so as to move it in the *y* direction. The shaft 146 is kept in abutting relationship with the plate 62 by two constant-tension spring members 148 and 150, whose extensible ends 152 and 154 respectively are secured to opposed sides of the plate 62. The lead screw member 140 also has a calibrated barrel 156, from which displacement readings in the *y* direction can be obtained. By the construction just described, the indexing table means 22 can be independently indexed in *x* and *y* positive and negative coordinate directions.

In the embodiment shown, the indexing table means 22 (shown principally in FIG. 4) has a travel of about 1 inch in both *x* and *y* coordinate directions.

Because the optical system (FIG. 1) used with the microscriber 20 has an extremely limited depth of focus, it is very important that the photographic emulsion of the medium 24 be precisely located at the plane of focus of the optical system. The structure for supporting the medium 24 is shown principally in FIGS. 2, 4, 5, and 7 and includes the mounting plate 76, which is shown in cross section in FIGS. 5 and 7. The plate 76 has a conical well 158, whose longitudinal axis is coincident with the longitudinal axis of a lens mount 160 positioned above the well 158. A medium support plate 162, having a spherical projection 164, is fitted into the well 158, so as to provide substantially a line contact when the projection 164 is positioned therein. With such an arrangement, the medium support member 162 may be tilted in the well 158, so as to enable a perfectly flat top surface 166 of the member 162 to assume a position which is parallel to the horizontal plane of movement of the indexing table means 22. The top surface 166 of the medium support member 162 is provided with spaced holes 168 leading to a cavity 170 therein. A conduit 172 (FIGS. 4 and 5) has one end thereof communicating with the cavity 170, and its other end is connected to a pump (not shown) for producing a vacuum within the cavity 170. When the photosensitive medium 24 (FIG. 7) is positioned on the top surface 166 of the support member 162 and is parallel to the plane of movement of the indexing table means 22, the vacuum created in the cavity 170 secures the medium to the top surface 166. The support member 162 has plates (like the plate 174, FIG. 7) secured around three sides thereof to align the medium 24 on the support member 162. The remaining side of the support member 162 has a recess 176 (FIG. 7) therein, enabling an operator's finger to slip under the medium 24 to facilitate the grasping thereof.

Figure 8:
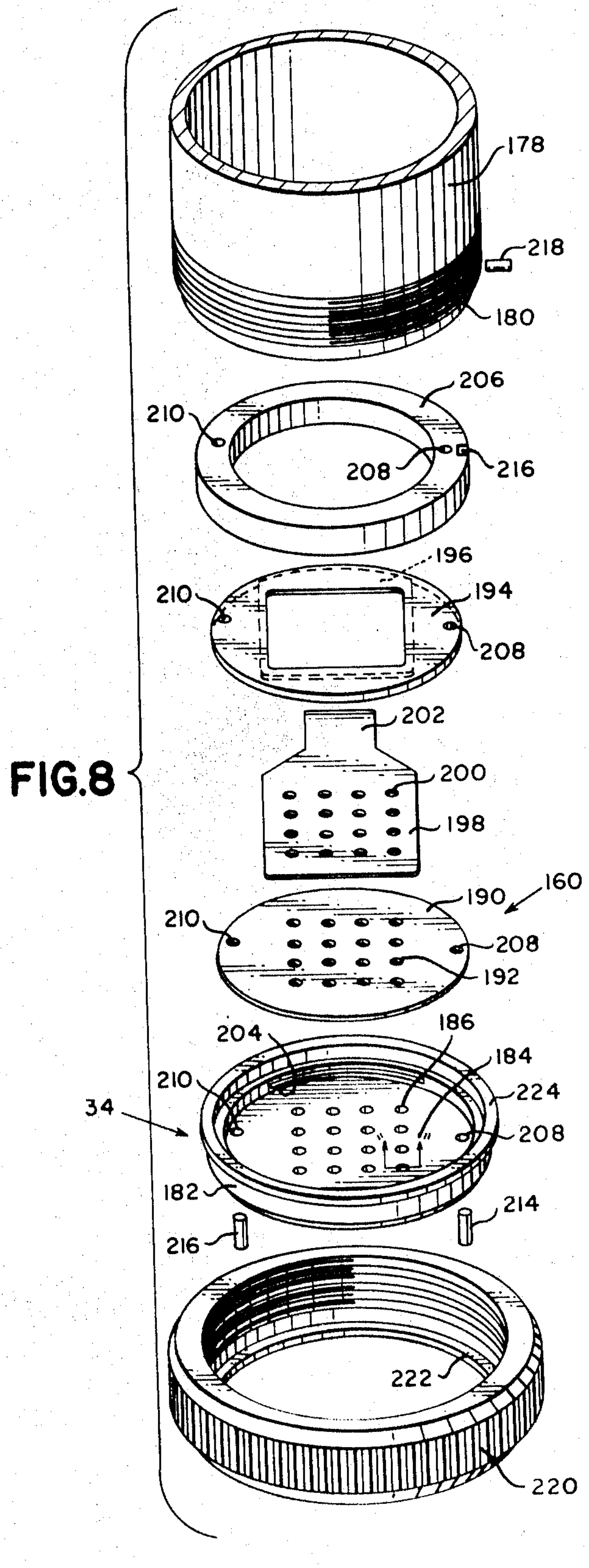
FIG. 8 is an exploded view of a portion of FIG. 7, showing a portion of the lens system used in this invention.

The lens mount 160 for supporting the multiple image lens unit 34 is shown in an exploded, perspective view in FIG. 8 and includes a lens barrel 178, which is threaded at 180. The lens unit 34 includes a circular member 182 having the cross-sectional shape shown in FIG. 7. The circular member 182 has a flat surface 184 having a plurality of holes 186 formed therein, which holes are arranged in the particular array desired for producing the multiple images mentioned earlier. Each of the holes 186 has therein a lens 188 (FIG. 7), the mounting of which is shown in detail in FIG. 11. An aperture plate 190, in the shape of a circular disc, has a plurality of tapered holes 192 arranged in the same array as are the lenses 188. The tapered holes 192 have their smaller diameter openings adjacent to the flat surface of the circular member 182. Another circular disc 194 is provided with a recess 196 on its underside (as viewed in FIG. 8), which recess is adapted to receive a lens-masking plate 198. The plate 198 has a plurality of holes 200 therein, which holes are aligned with the individual lenses 186. When particular lenses 186 are not to be utilized in exposing particular areas of the medium 24, the plate 198 is prepared without holes in those affected areas. The plate 198 has a handle 202 to facilitate the insertion of the plate through a slot 204 appearing in the circular member 182. An annular ring 206 is positioned above the disc 194, as shown in FIG. 8. There are alignment holes 208 and 210 in the circular member 182, the aperture plate 190, the disc 194, and the ring 206, into which pins 212 and 214 are inserted to maintain these named elements in alignment with one another. The ring 206 also has an axially aligned recess 216 on its periphery, into which a pin 218 is inserted; the pin 218 passes through a hole in the lens barrel 178 to prevent the ring 206 and the elements pinned thereto from rotating relative to the lens barrel 178. All of the elements pinned to the ring 206 are secured to the lens barrel 178 by a retaining ring 220, which is internally threaded to be secured to the threads 180 on the barrel 178. The ring 220 has an inwardly extending flange 222, which abuts against a complementary outwardly extending flange 224 (FIG. 7) on the circular member 182 to secure the multiple image lens unit 34 and related elements to the lens barrel 178.

The construction for mounting the lens barrel 178 in the frame of the microscriber 20 is shown principally in FIG. 5. The lens barrel 178 is slidably mounted in a stationary sleeve 226, which is fixed to horizontal supports 228 and 230, which in turn are secured to a vertical support 232, which is secured to the base 50. The upper end of the barrel 178 (as viewed in FIG. 5) is externally threaded to receive an internally threaded capping member 234. The capping member 234 has a depending annular flange 236 and an annular recess 238 positioned adjacent to each other, as shown in FIG. 5. The recess 238 is axially with an annular projection 240 on the sleeve 226 to provide a fine adjustment which enables the lens barrel 178 to be adjusted axially upwardly within the sleeve 226 when the barrel 178 is moved downwardly from the position shown in FIG. 5.

The lens barrel 178 is moved axially within the sleeve 226 by the construction shown principally in FIG. 5. The construction includes an operating handle 242, which is rotatably mounted and retained in the sleeve 226 by a flange shaft 244. The handle 242 has a pin 246 eccentrically located on a face of the flange shaft 244, and the pin is fitted into a horizontally positioned recess located in the wall of the lens barrel 178. As the handle is rotated about the flanged shaft 244 in one direction, the pin 246 and the recess in the lens barrel 178 coast to lower the barrel 178 (as viewed in FIG. 5) to bring the flat surface 184 of the multiple image lens unit 34 into engagement with the medium 24. Because the medium 24 is supported on the medium support member 162, which can be tilted in the well 158, the medium 24 will assume a position in which it is parallel with the lens unit 34 and parallel to the plane of movement of the table means 22. The lens barrel 178 is kept from rotating in the sleeve 226 by a set screw 248, whose end slides is vertically aligned slot 250 located in the barrel 178 (FIG. 5).

In order to assure that the multiple image lens unit 34 is positioned accurately relative to the medium 24, the following adjustment means is provided for the lens barrel 178, to which the lens unit 34 is secured. The lens unit 34 is lowered onto the medium 24 to get the upper surface of the medium 24 parallel to the lens unit 34, as previously explained, and, thereafter, the lens barrel 178 is moved away axially from the medium 24 for a fixed distance to establish a correct focus setting. To know when the proper amount of backing-away from the medium 24 is obtained, a gauge 252 (FIG. 2) is secured to the lens barrel 178 to travel axially therewith. The gauge 252 has a plunger 254, which is aligned with a pedestal 256, which is secured to the stationary sleeve 226. As the lens barrel 178 is lowered towards the medium 24 by the handle 242 to position the medium 24 parallel to the lens unit 34, as previously explained, a reading will be available on the gauge 252. To move the lens unit 34 away from the medium to establish the correct face setting, the capping member 234 is rotated by a handle 258, so that a surface 259 in the annular recess 238 (FIG. 5) contacts the annular projection 240 to axially move the lens barrel 178 and the lens unit 34 away from the medium 24 for the adjustment amount, which can be easily read from the gauge 252. This small adjustment of the lens unit 34 away from the surface of the photosensitive medium 24 provides for accurate adjustment of the lens unit 34 to the medium 24, and also provides a clearance between the lens unit 34 and the medium 24, enabling the medium to be moved under the lens unit 34 by the indexing table means 22.

Figure 9:
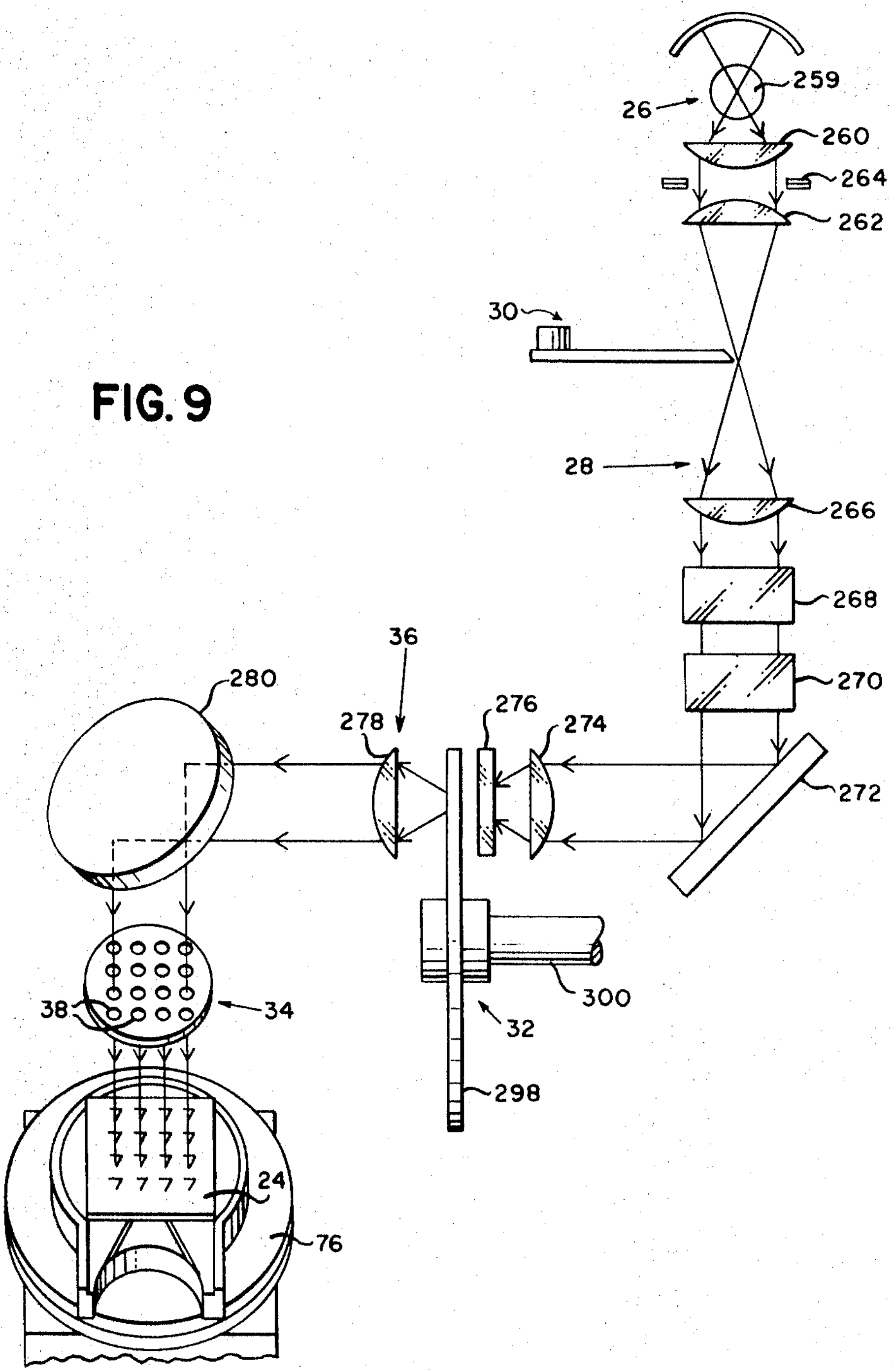
FIG. 9 is a schematic diagram showing more details of the lens system used in this invention.

The multiple image lens unit 34 is part of the optical system used in the microscriber 20, and the optical system is shown schematically, in more detail, in FIG. 9. The system includes the light source means 26, which includes a lamp 259, of the mercury arc type, and a pair of conventional condenser lens 260 and 262, with a conventional iris 264 positioned therebetween. As the intensity of the lamp 259 decreases with use, the iris 264 can be widened to maintain the same level of light intensity in the system. A photocell (not shown) may be used as a check on the light intensity to signal a change required at the iris 264. From the condenser lens 262, the light rays from the light source pass through focus to the collimating lens means 28, which includes a collimating lens 266, and the filters 268, 270. The shutter means 30, to be described later, is positioned between the lens 262 and 266 and permits light to pass thereby only when the shutter means is opened. The filter 268 is a conventional filter, like a Corning yellow pass filter, which is used for admitting the green light of the mercury arc lamp 259, and the filter 270 is a conventional filter, like a neutral density filter, which is used for controlling the light intensity from the lamp 259. The light passing through the filters 268 and 270 is reflected off a mirror 272, positioned to rotate the optical axis through 90° to the collimating lens means 36, which includes a condensing lens 274, a diffusing plate 276, and a collimating lens 278. The aperture means 32, mentioned earlier in relation to FIG. 1, is positioned between the diffusing plate 276 and the collimating lens 278, as shown in FIG. 9. From the collimating lens 278, the light is directed to a mirror 280, which is positioned at 45° to the optical axis of the system, so as to direct the light down to the multiple image lens unit 34.

The mirror 280 is supported in the lens barrel 178 by the construction shown in FIG. 5. The construction includes a sleeve 282, which is positioned and retained inside the lens barrel 178 by a bin 283 (FIG. 7). The sleeve 282 is cut along a plane which is positioned at an angle of 45° to the optical axis of the optical system to provide a support for the mirror 280, as shown. The sleeve 282 has an aperture 284 therein to permit light to pass along the optical axis of the optical system. When the handle 242 is actuated to lower the lens barrel 178 to an "in-use" position, the center of the aperture 284 coincides with the optical axis of the optical system. The collimating lens 278 is located within a tubular housing 286 (FIGS. 2 and 3), which is secured by a clamp 288 to a horizontal support 290 supported on vertical supports 292 and 294 (FIG. 4), which are secured to the base 50. The tubular housing 286 has a lens aperture 296 located along the optical axis of the system. The collimating lens 278 shown schematically in FIG. 9 is a conventional lens and consists of a front doublet lens (278*a* and 278*b*) and a rear doublet lens (278*d* and 278*e*) shown in FIG. 2. The diffusing plate 276 and the condensing lens 274 shown in FIG. 9 are conventionally mounted in a housing 274H, secured to a horizontal support 290, shown in FIG. 3, and, similarly, the collimating lens 266, shown in FIG. 9, is mounted in a housing 266H, secured to the support 290. The condenser lens 260 and 262 are located in a housing 260H, also secured to the support 290.

Figure 2:
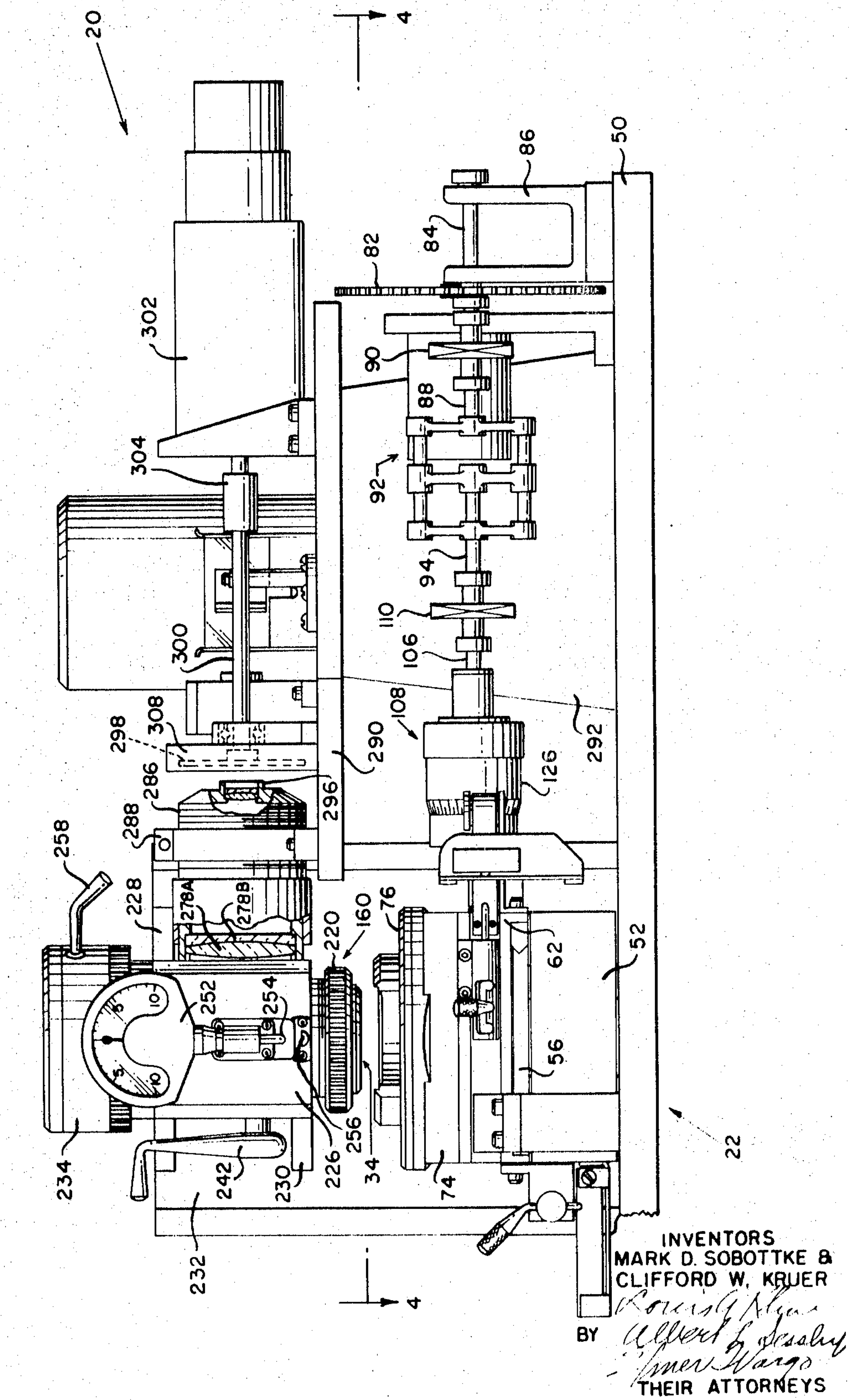
FIG. 2 is a front view, in elevation, of this invention, showing the general arrangement of the indexing table and lens system.
Figure 6:
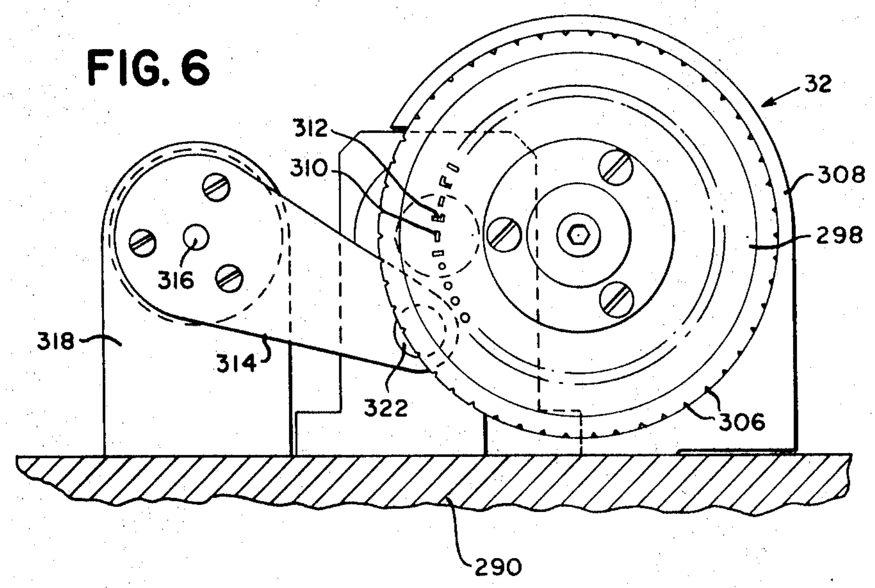
FIG. 6 is an enlarged elevational view, taken along the line 6—6 of FIG. 3 to show additional details of the aperture selection means used for shaping the pattern image.

The aperture selection means 32 is located near the lens aperture 296 (FIG. 2) of the housing 286 and is constructed in the following manner, as shown principally in FIGS. 2, 3, and 6. The aperture election means 32 includes an aperture plate 298, which is fixed to a shaft 300 to rotate therewith. The shaft 300 (FIG. 2) is connected by a coupling 304 to the output shaft of a bidirectional stepping motor 302. The motor is fixed to and supported on the horizontal support 290. The plate 298 is located in a housing 308, and the plate 298 has a plurality of notches 306 around its periphery. The notches 306 are used to give a visual indication of the angular position of the plate 298 relative to the optical axis. The shaft 300 is rotatably supported in the housing 308, which is secured to the horizontal support 290. The plate 298 has a plurality of apertures, line 310, 312, and alphanumeric characters, which are located along radial lines on the perimeter of a circle whose center lies on the rotating axis of the shaft 300. The particular aperture marked 310 (FIG. 6) is located along the optical axis of the system and is in position to shape the image to be projected on to onto the photosensitive medium 24 (FIG. 1). The motor 302 for indexing the plate 298 so as to position a preselected aperture at the optical axis is controlled by the aperture selection circuit 33 (FIG. 1).

Also included with the aperture means 32 is a lever 314 (FIGS. 6 and 3), which is fixed to a shaft 316, pivotally mounted in a support 318, which is secured to the horizontal support 290. The shaft 316 is part of a conventional rotary solenoid 320, which is secured to the support 290. The free end of the lever 314 has therein an aperture in which a diffusion filter 322 (FIG. 6) is mounted. The lever 314 is shown in an inoperative position in FIG. 6, and, when the diffusion effects of the filter 322 are desired in addition to that provided by the plate 276, the rotary solenoid 320 is energized to rotate the lever 314 counterclockwise (as viewed in FIG. 6) to position the diffusion filter 322 in the optical path, which in FIG. 6 is directly behind the aperture 310. The rotary solenoid 320 is energized by the aperture selection circuit 33 (FIG. 1) and is returned to the inoperative position, shown in FIG. FIG. 6, by a conventional spring return located within the solenoid. Because the apertures like 310 may be in the form of alphanumeric characters which are large compared to certain of the apertures shown in FIG. 6, the images resulting from the use of the characters tend to print too dark. The diffusion filter 322 serves as a neutral density filter which illuminates a larger area on the aperture plate at the optical axis whenever a character or a large aperture is to be printed to avoid the too-dark printing.

Figure 10:
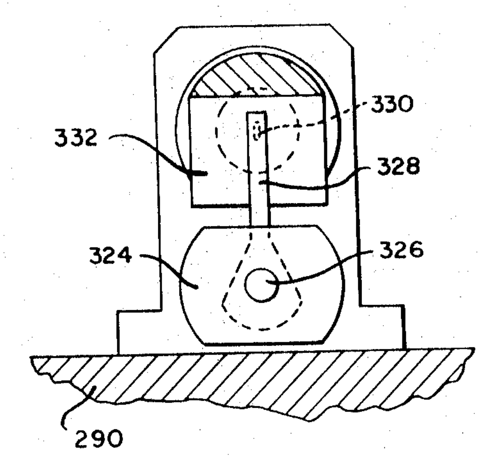
FIG. 10 is an enlarged, elevational view taken along the line 10—10 of FIG. 3, showing additional details of a shutter mechanism used in the invention.

The shutter means 30 shown in FIG. 1 is shown in more detail in FIG. 10 and includes a conventional asynchronous stepping motor 324, which steps one step in one direction and another step in the opposite direction to the position shown. The motor 324 has an output shaft 326, to which one end of an opaque arm 328 is fixed. The remaining end of the arm covers a slot 330 located in a plate 332. The slot 330 is located along the optical axis of the optical system shown schematically in FIG. 9. The stepping motor 324 is controlled by the numerical controller 42 (FIG. 1) according to instructions in the media 40, so as to permit the light from the lamp 259 to pass at the required time, for the required duration.

Figure 11:
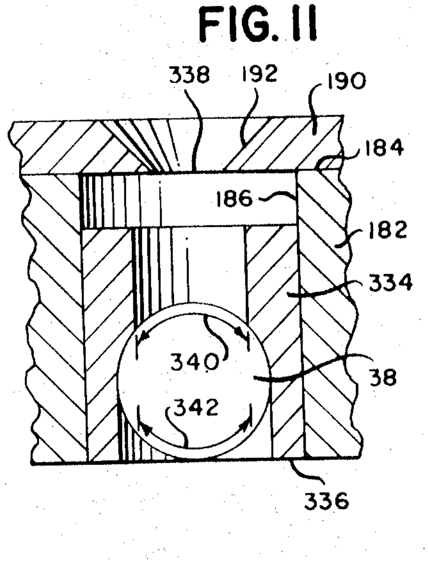
FIG. 11 is an enlarged, cross-sectional view of one of the lenses used in a multiple image lens unit of this invention and is taken along the line 11—11 of FIG. 8.

The construction of the individual lenses 38 of the multiple image lens unit 34 shown in FIG. 1 is shown in more detail in FIG. 11. Each individual lens 38 is formed from a droplet of molten glass which is formed into a spherical bead. The beads so formed are selected for size and clarity, so as to obtain a set of lenses which are as identical as practical classification and inspection methods will permit. Each individual lens 38 is then mounted in a sleeve 334. The sleeve 334 has an enlarged diameter therein to receive the lens 38, which is cemented therein, so that the lowermost surface of the lens (as viewed in FIG. 11) is aligned with or extends slightly beyond the lower rim 336 of the sleeve 334. The sleeve 334 is then cemented in a hole 186 in the circular member 182 of the multiple image lens unit 34, so that the lowermost surface of the lens 38 (as viewed in FIG. 11) and the lowermost surfaces of the other lenses 38 lie in a common plane which is parallel to the lower surface of the circular member 182 (FIG. 7) and also parallel to the plane of movement of the indexing table means 22. When the aperture plate 190 is positioned over the flat surface 184, the smaller diameter 338 of the corresponding tapered hole 192 is aligned over the associated lens 38, so that the longitudinal axes of the tapered hole 192, the sleeve 334, and the lens 38 are coincident. In one embodiment of the invention, the lens 38 has a diameter of 0.0520 inch. The smaller diameter of the sleeve 334 is 0.040 inch, and the axial length of the sleeve is 0.080 inch. The depth of the hole 186 in which the sleeve 334 is mounted is 0.100 inch, and the smaller diameter 338 of the tapered hole 192 is 0.025 inch. When the lens 38 is positioned in the sleeve 334, only the areas defined by the arcs 340 and 342 are used. It was discovered that a minimum of aberration occurs when the areas defined by the arcs 340 and 342 are used and the aperture 338 has a particular diameter and is located at a specific distance away from its associated lens 38. The smaller diameter 338 in the plate 190 serves as an aperture for its associated lens 38.

What is claimed is:

1. A device for generating geometric patterns on a photosensitive medium, comprising:
indexing table means adapted to be moved in $x$ and $y$ coordinate directions at right angles to each other
Means for supporting said medium on said table means;
a source of light; and
an optical imaging means for projecting light from said light source along an optical path in a single pattern image which is simultaneously repeated many times on said medium,
said imaging means including:
an aperture means for shaping said single pattern image;
a multiple image lens unit having a plurality of individual lens; and
a collimator lens means positioned along said optical path between said aperture means and said lens unit so as to direct said single pattern image through each of said individual lenses along a path substantially coincident with the optical axis of each said individual lens so as to simultaneously repeat said pattern image on said medium;
said multiple image lens unit including:
a flat plate having a plurality of holes therein arranged in a predetermined array;
mounting means for mounting one of said individual lenses in each one of said holes; and
an aperture plate positioned in perpendicular to said optical path before said flat plate and adapted to control the light reaching each one of said individual lenses.

2. The device as claimed in claim 1 in which each one of said individual lenses is a spherical lens.

3. The device as claimed in claim 2 in which said mounting means includes a sleeve member for each said individual lens, said sleeve member having first and second diameter portions with said spherical lens being mounted in said second portion, which has a diameter greater than the diameter of the first portion so that the first diameter portion acts as a mask permitting selected areas of the associated lens to be used.

4. The device as claimed in claim 3 in which said selected areas of each said lens which are used are spherical portions on opposed sides thereof.

5. The device as claimed in claim 4 in which said imaging means further includes a mask means for selectively masking preselected ones of said individual lens of said multiple image lens unit.

6. The device as claimed in claim 1 in which said means for supporting said medium on said table means includes:
a support member having a conically-shaped hole therein;
a plate member having a flat surface on one side thereof to receive said medium and a spherical projection on the opposed side thereof adapted to fit into said conically shaped hole so as to enable said flat surface to be positioned parallel to the plane of movement of said table means; and
a lens barrel means mounted in a frame means for movement along an axis which is perpendicular to the plane of movement of said table means; and
a lens barrel means mounted in a frame means for movement along an axis which is perpendicular to the plane of movement of said table means;
said multiple image lens unit being mounted on said lens barrel means so as to be perpendicular to said axis;
and means for lowering said lens barrel means so as to bring the individual lenses of said lens unit into engagement with a medium positioned on said flat surface of said plate member to thereby position said medium parallel to said plane of movement of said table means, and for raising said lens barrel means slightly for a predetermined distance so as to enable said table means with said medium thereon to move freely relative to said lens unit and to focus said imaging means on said medium; and
means for releasably locking said plate member and medium on said table means.

7. A device for automatically generating geometric patterns on a photosensitive medium, comprising:
indexing table means adapted to be moved in a first plane in $x$ and $y$ coordinate directions at right angles to each other;
means for releasably supporting said medium on said table means so that it travels in a second plane parallel to said first plane;
a source of light;
optical imaging means for projecting light from said source along an optical path in a single pattern image which is simultaneously repeated on said medium;
said imaging means including:
an aperture means for shaping said pattern image;
a multiple image lens unit having a plurality of individual lenses; and
a collimator lens means positioned along aid optical path between said aperture means and said lens unit so as to direct said single pattern image through each of said individual lenses along a path substantially coincident with the optical axis of each of said individual lenses so as to simultaneously repeat said pattern image on said medium; and
control means for controlling the movement of said indexing table means and said aperture means so as to generate said geometric patterns in response to instructions in a record medium;
said individual lenses being spherical in shape and substantially identical to one another with the center of each said individual lens lying in a common plane which is parallel to said first plane; and
said multiple image lens unit having means to control the amount of light passing through each said individual lens.

8. The device as claimed in claim 7 in which said aperture means includes a plate means having predetermined shaped holes near the perimeter thereof, said aperture means being adapted to position preselected ones of said shaped holes at said optical path so as to produce said pattern image in response to said control means.

* * * * *